Patented June 15, 1948

2,443,429

UNITED STATES PATENT OFFICE 2,443,429

PROCEDURE FOR DISINFECTING AQUEOUS LIQUID

Henry Clay Marks, Glen Ridge, and Frede Bernhardt Strandskov, Belleville, N. J., assignors to Wallace & Tiernan Products, Inc., Belleville, N. J., a corporation of New Jersey No Drawing. Application September 26, 1947, Serial No. 776,420

22 Claims. (Cl. 210—11)

In procedures for disinfecting aqueous liquids, circumstances have sometimes made it impractical or at least troublesome to obtain fully satisfactory results with treatment of a customary type, e. g. methods involving the introduction of chlorine in elemental or other available form. An outstanding example is in the case of swimming pools, where it has been very difficult to maintain any reasonably effective degree of sterilization.

For instance, where chlorine alone is used to treat the water of the pool, trouble arises not only because of the heavy organic content which includes much of a harmless nature, but also because of the almost inevitable presence of ammonia, introduced from the swimmers. At least a part of the active chlorine is converted to chloramines by reaction with the ammonia, and while in a general sense chloramines represent available chlorine for sterilization purposes, their rate of operation or activity is relatively slow. In a swimming pool, their slowness of reaction is undesirable since organisms emanating from one swimmer may infect another swimming nearby before the chloramine content has had sufficient time to destroy the organisms. Indeed it would seem that even where free chlorine may be present in a given part of the pool, it is apt to be converted to chloramines by the small quantities of ammonia introduced by a swimmer, before it, i. e. the free chlorine, could have any appreciable bactericidal effect on organisms released from the same swimmer.

On the other hand, if sufficient chlorine is added so that an excess would always remain over that necessary to form chloramines, i. e. so as to maintain a substantial residual of free, active chlorine (in hypochlorous form, as distinguished from the chloramine residual), the well known breakpoint reaction is apt to occur, resulting in the evolution of nitrogen trichloride which is irritating to the eyes and has a bad odor. The last mentioned reaction usually proceeds until all the free chlorine disappears or until all the ammonia disappears, viz. all the nitrogen present at the moment in the ammonia type of combination, including chloramines as well as unreacted ammonia.

In a well used swimming pool, then, ammonia is continuously being introduced into the water by persons present, and furthermore when there is a reasonably heavy load of swimmers free chlorine is consumed so rapidly that sterilization against infection simply cannot be assured, i. e. even from a chlorine dosage heavy enough to provide some free residual over the chloramine content. As a result of the described conditions and particularly in order to avoid the unpleasantness of nitrogen trichloride, swimming pool operators have refrained from trying, by heavy chlorine dosage, to keep a relatively substantial residual content of free chlorine under all circumstances. For instance, the chlorine introduction may simply be limited to avoid the breakpoint reaction, the amount of chlorine being then such that a free residual is exhibited only when there are few swimmers, and such that under a heavy load chloramine alone will be present and at times only a dangerously small quantity of the latter. Another practice is to introduce ammonia along with or at the same time as the chlorine, in sufficient quantity to insure conversion of all the chlorine to the chloramine form; in this way it is feasible to maintain a considerable residual of a disinfecting agent at all times (merely by feeding enough chlorine and ammonia), but the agent is chloramine, characterized by a slow reaction rate as explained above. In either of these cases, irritation and unpleasant odor may be avoided but the sterilization rate usually remains very slow, with danger of infection of one swimmer by another near him even though organisms which have been in the pool for longer times may eventually be destroyed.

From the standpoint of sterilization in swimming pools and the like, better results could often theoretically be obtained by using bromine or iodine instead of chlorine, since their sterilization rates are much less affected by the presence of ammonia. In fact, the activity of iodine does not seem to be reduced by ammonia at all. Both of these substances, however, are quite expensive to use; they cost more per pound than chlorine and a greater weight is required, since the sterilization efficiency varies in accordance with atomic weight. For instance, the continuous introduction of iodine would be prohibitively expensive for most swimming pool operations at the present time, and a like feeding of bromine would be at least undesirably expensive. Furthermore, the highly corrosive nature of bromine makes it somewhat dangerous to handle, and iodine, a sticky insoluble solid, is also difficult to use.

It has now been found that remarkably improved results, both in sterilization efficiency and in convenience to swimming pool users, as well as in matters of economy and ease of operation, may be obtained by a new procedure, i. e. in accordance with the present invention. For example, in the improved treatment of swimming pool water, the latter is subjected continuously, or from time to time, to the introduction of chlorine (with or without ammonia) in sufficient amount to maintain at least a substantial residual of some form of available chlorine in the pool. At the same time there is originally introduced into the pool water, a quantity of a halogen of greater atomic weight than chlorine, i. e. bromine or iodine, to maintain a desired but not necessarily large concentration of bromine or iodine atoms in the pool at all times. According to a further feature of the invention, the bromine or iodine may be introduced in the halide form, e. g. as a soluble bromide or iodide.

Pursuant to the preferred procedure, the available chlorine oxidizes at least a substantial part of the bromide or iodide to available halogen, i. e. converting bromide or iodide to active bromine or iodine, it having been found that in the converted form the substances are (like bromine or iodine elementarily introduced) as active as free chlorine and fully capable of a rapid sterilization effect. The available chlorine may at least in part be in the form of chloramines; in fact where an iodide has been introduced and even when the chlorine is wholly in the chloramine form, the oxidation of the iodide to iodine can be complete, providing of course that there is sufficient chloramine or other available chlorine present to afford a quantitative reaction. A particularly advantageous feature of the process is that as fast as the bromine or iodine is reduced back to bromide or iodide by organic demand in the water, e. g. as fast as the reaction of bromine or iodine with undesired organisms converts the reagents to the halide form, the available chlorine in the water tends to reoxidize the bromide or iodide back to the free or active state of the halogen.

In this way a desirable concentration of a rapid disinfecting agent can be maintained at all times, with at least the sterilizing efficiency which would characterize free chlorine and without the disadvantages of instability and of unpleasant odors and irritating effects that are explained above. At the same time, the procedure is otherwise more convenient and economical than a direct and continuous treatment with bromine or iodine alone, since in many cases the selected element can be added in the convenient form of a bromide or iodide, and in practically all cases need only be added at infrequent times, i. e. in the amount necessary to make up for loss due to physical removal of water from the pool, and its replacement with fresh, untreated water.

In a more general sense, the present invention is designed to provide a more rapid or a more prolonged and intense sterilizing effect than is possible in many cases by the use of chlorine in ordinary amounts or without other inconvenience. The results are achieved economically, without the disadvantages of handling a continuous or a like regular supply of bromine or iodine; in fact the presently preferred practice only requires the use (no more than infrequently) of a soluble bromide or iodide, such as a salt of potassium or sodium. The bromide and iodide salts are non-corrosive materials which are much easier to handle than free bromine or iodine. For many purposes the use of bromine or iodine in accordance with the present invention has distinct advantages over free chlorine itself, even in circumstances where it is possible to use the latter satisfactorily; for instance, these halogens of higher atomic weight than chlorine are not as readily converted to hypobromite or hypoiodite ions as chlorine is to hypochlorite ion, it being understood that hypohalite ions are all characterized by little or no germicidal activity.

A further advantage of the present process, notably in the case of swimming pool treatment, is that there is less danger of toxicity to the users of the water than would occur if bromine or iodine were continuously added as free elements to maintain a suitable residual in the face of the continuing organic demand, i. e. to overcome the constant introduction of unwanted organisms into the water. In the latter case the introduced halogens would be continuously converted to bromide or iodide and the concentration of ions of the latter would consequently build up in the pool water, even to a physiologically harmful extent unless the water is changed at proper intervals. The improved process, however, obviates such possibility, since neither the bromide nor the iodide need ever be introduced beyond a practical maximum for each, which may be substantially less than any conceivably objectionable amount.

As intimated above, improved procedure of the sort herein disclosed is useful in other circumstances than swimming pools, as where like conditions render ordinary chlorine treatment unsatisfactory, or where it may be desirable for other reasons to employ bromine or iodine as a sterilizing agent instead of or in addition to chlorine.

For example, a particularly effective treatment for aqueous liquid flowing in a continuous stream or otherwise circumstanced so that it is to be treated only once, involves introducing bromine or iodine atoms into the liquid in a limited amount, and separately adding a quantity of chlorine which will react to an appreciable extent or at least as far is it can, with the organic matter present and which will also insure conversion or reconversion of the iodine or bromine content into active halogen to the desired extent for a persistent purifying function. According to present preference for such cases, of which community water supplies and supplies of industrial cooling water are examples, a bromide or iodide is first added to the water in an amount sufficient only to furnish the concentration of free iodine or bromine which it is ultimately desired to have present. Then chlorine is added, preferably in sufficient quantity to consume all of the contaminating substances which otherwise at that time would react with free bromine or iodine to reduce the latter to bromide or iodide, the quantity of chlorine being additionally sufficient, i. e. including a suitable further amount, to react with the iodide or bromide and thereby produce the corresponding free or active halogen in the desired concentration.

According to present understanding, a full realization of the advantages of the invention is achieved only where the chlorine and the iodide or bromide are added wholly separately to the aqueous liquid under treatment, rather than as a previously established mixture. In all cases, whether for continuously flowing bodies or for recirculated systems such as swimming pools, the exact concentration or residual of active bromine or iodine that is to be established in the liquid will depend on the nature of the latter and of its contaminations, and on the extent of sterilization desired. Just as in employing chlorine for purification, the normally required quantity of the active agent is very small when measured by the standards of other chemical operations; in most cases, for instance, a maximum of 2 parts per million (P. P. M.) is fully adequate, and in general the final or ultimate concentration of the selected halogen in its available (active) form can be, and in swimming pool water usually should be, kept below about 2 P. P. M. It will be understood, however, that procedures such as herein described may be usefully carried out with higher concentrations (than 2 P. P. M) of the chlorine and of iodine or bromine, for instance up to 100 P. P. M., providing the circumstances are such that a correspondingly high concentration of halogen in any form would be permissible; indeed under appropriate conditions the described type of procedure can be expected to have utility even at relatively very high values of halogen content.

By way of further example, an improved process for treating a swimming pool may therefore involve initial introduction of a predetermined quantity of an iodide salt into the pool water, e. g. sodium or potassium iodide, which dissolves readily. Then the water of the pool is subjected to chlorine treatment or to continuation of previously employed chlorine treatment either by the use of chlorine gas in feeding equipment of the usual sort or by supplying hypochlorite solution, as with apparatus also now employed for such purposes in swimming pool operation. At the same time, if desired, ammonia can be introduced, e. g. to avoid any possibility of such excessive free chlorine residual as might tend to liberate nitrogen trichloride. However, in many cases the chlorine supplied, either continuously into a recirculated stream of water from the pool or in some other continuous or periodic, regular manner, need be no more than a moderate amount sufficient to react with the ammonia occurring in the pool to create chloramines, providing only that there is maintained at all times a sufficient residual of available chlorine, e. g. 0.3 to 2.0 P. P. M., at least in the chloramine form, for the repeated or continuing reaction with iodide, as well to account for such chlorine (or rather chloramine) as may itself be consumed, more slowly, by some portion of the organic contamination.

In the course of operation the available chlorine then serves rather promptly to convert the iodide into free iodine, which has a rapid sterilizing effect. The liberated iodine is effectively useful in destroying organisms in the pool water, and by such reaction is reconverted to the iodide form. As soon, however, as it is thus reconverted, the maintained chloramine (or chlorine) residual reacts to convert the iodine again into available state, for further sterilizing function. Thus by maintaining in the water a predetermined concentration, for instance 0.2 to 2.0 P. P. M,. of iodine atoms which can be introduced as iodide, and by supplying available chlorine in a moderate amount and without effort to prevent its conversion to chloramines, the process serves to keep an effective residual of active iodine in and throughout the swimming pool at all times. To the extent that water is lost from the pool and replaced, additional iodine atoms should be introduced, again conveniently in the form of a soluble iodide. It will now be understood that the amounts of iodide to be addd, and the requisite rate of chlorine supply, can be readily determined, if necessary by simple test under actual conditions of use, so that a desired concentration of available iodine, e. g. selected from the range of 0.2 to 2 P. P. M., is maintained throughout the pool.

Tests have indicated that the reaction between the iodide and available chlorine is quantitative whether the latter is present as free (hypochlorous) chlorine or as chloramine. That is to say, if there is sufficient available chlorine for quantitative reaction, all of the iodide present at a given time is converted to free iodine, and thus substantially all of the iodine present in the swimming pool water is maintained in the available state, except for small amounts lost as iodate, and except for such proportion as is actually undergoing reaction in destroying organic contamination. The quantitative character of the reaction is surprising under the circumstances necessary or preferable here, i. e. under conditions of extremely high dilution and with a deficiency rather than excess of the iodide, relative to the chlorine.

Certain actual tests demonstrating this characteristic of the iodide and reaction under the conditions last mentioned, were based on the fact that sodium nitrite reacts quantitatively and rapidly with hypochlorous acid to reduce it to chloride but neither reacts with iodine nor releases iodine from iodide at neutral pH. Thus free iodine can be distinguished from free chlorine by adding nitrite to a sample under test and then titrating with arsenite amperometrically, the titration being effected as described by Marks and Glass, in the Journal of the American Water Works Assn., vol. 34, page 1227, August 1942. Specifically, a sample of water was treated first with an iodide and then with free chlorine in measured amounts, e. g. each of the order of hundredths of a milliequivalent per liter. After a few minutes, the sample was divided, part being titrated by the arsenite method (to find the total oxidizing agent), and another part being first treated with sodium nitrite and then so titrated, i. e. to determine free iodine alone. Both titrations showed the same amount of oxidizing agent, and hence demonstrated that it was all in the form of free iodine. Repetition of these and like tests under various conditions, as at different pH values of the water, or with the use of a definite deficiency of iodide, or with chloramines instead of free chlorine, confirmed the stated results.

The foregoing and other experience indicates that optimum results in the sense of economy and efficiency are had by keeping the total iodine (iodide and free iodine) concentration in the swimming pool at such value relative to the available chlorine, that not more than a major part of the latter undergoes reaction with the iodide; more generally stated, the total iodine concentration need ordinarily not be greater in a stoichiometric sense and may often advantageously be less than the total content of available chlorine which is maintained in the water by the continuous feed of chlorine thereto. As long as there is available chlorine in stoichiometric excess over the iodine, it is not possible for any of the iodine to remain in the iodide form.

In general, the manipulative steps involved in effecting treatment of swimming pools or the like with bromine in accordance with the invention are of the nature indicated above. Thus a desired amount of bromine, e. g. as sodium, potassium or other soluble bromide is introduced at the outset and thereafter chlorine is supplied in a regular manner to maintain a desired residual of available chlorine, for instance, partly free chlorine and partly chloramines. Upon conversion of quantities of bromide to free bromine, by the oxidizing influence of chlorine, the bromine is available for reaction to destroy organic contamination, and the chlorine has a continuing effect toward reconversion of the resulting bromide into free bromine. Further quantities of bromide may be added as necessary from time to time, usually infrequently, to make up for losses due to change of any part of the water in the pool.

Tests have indicated that the reaction between free chlorine (e. g. as HOCl) and bromide is quantitative under circumstances of the present process, but when the chlorine is in the form of chloramines the reaction with bromide may not go to completion in a quantitative sense. When bromine is first generated from bromide by free chlorine at a dilution of the character contemplated in these treatments, and when ammonia is thereupon added to the water, it appears that some of the bromine remains uncombined, i. e. not combined with ammonia. If excess bromide is present under such circumstances, a very large proportion of the bromine seems to be kept from so combining, although bromamine nevertheless appears to be a desirably active agent. On the other hand, if chlorine and ammonia have already combined to form chloramines without leaving an appreciable excess of free chlorine, and if bromide is introduced only after the establishment of such condition and then not in excess stoichiometrically, the production of any available bromine has usually been found to be much reduced. Within limits, if greater quantities of bromide are used, e. g. if more and more of an excess is maintained, increasing quantities of available bromine can be produced. That is to say, the advantages of the instant process with bromine appear to be best realized when a substantial excess of bromide is present in the water; for example, under such conditions in a swimming pool, a satisfactory concentration of bromine in available form may then be readily maintained by successive reconversions from bromide as the reaction with organic contamination proceeds.

According to present understanding the foregoing and other reactions, as explained below, appear to govern the maintenance of available bromine in useful amounts in swimming pool treatments or other repetitive processes of the present invention. Thus when chlorine is introduced into a stream of water containing both bromide and ammonia it is at present believed (although perhaps not scientifically certain) that several reactions occur. There appears to be considerable immediate reaction between free chlorine and bromide, and also with the ammonia, to produce a mixture of free bromine and bromamine (which is understood to have a rapid sterilizing action, too), the actual proportion of these two forms being presumably dependent upon the bromide concentration. At the same time the free chlorine reacts with ammonia to produce chloramines and apparently the latter then react at least to a small extent with the bromide as explained above.

In consequence it is presently preferred that in treating swimming pools and the like, the total bromine concentration, e. g. including bromide and free bromine, be maintained in substantial excess relative to the available chlorine residual. For instance, in swimming pools where the ammonia concentration may be relatively substantial (e. g. an ammonia nitrogen content of 0.5 P. P. M. or more), or may vary widely, and where the available chlorine residual is kept at about 0.5 P. P. M. or within 0.4 to 1.2 P. P. M., the total concentration of bromine atoms may be at least 2 P. P. M. and very preferably should be from about 10 to 25 P. P. M. Within or outside this range, moreover, the proportions ought usually to be such that an available bromine concentration of at least about 0.3 P. P. M. but conveniently less than 2 P. P. M. is maintained, it being thus understood that by far the major part of the bromine atoms remain in the form of bromide at any given time.

As stated, in operating either with iodine or bromine, further iodide or bromide is added from time to time to make up for mechanical losses. In fact, in actual practice with either iodine or bromine some small percentage of these elements is continuously being lost by conversion to iodate or bromate, which do not appear to react with chlorine to release the active halogen. Thus as iodate or bromate accumulates over a period of time in the water of the pool, there is a corresponding loss of the potentially effective halogen and the regular replacement of iodide or bromide that is effected to take care of additions of fresh water from time to time, should also take into account the further loss just mentioned, which is fortunately small in most cases.

As further and more specific illustration of the invention, accounts are given below of certain treatments that have been actually used in swimming pool operation. In the first such example, the process was applied to an outdoor pool containing 100,000 gallons of water circulated at such a rate as to cause a complete turnover every eight hours. At least once a day some make-up water was added to compensate for that lost through leakage, evaporation and the like. The purifying system already in use included sand filters and an alum pot, the latter employing ammonium-alum but in such small quantities that no great amount of ammonia was thereby incorporated. Hence the supplied residual of chlorine tended mostly to remain in the free state, except to the extent that ammonia in significant amount was introduced by the swimmers. Throughout the test chlorine was fed during the daytime, i. e. when the pool was in use, at a rate of 2.5 pounds per day. Periodically, and in fact specifically as noted below, sufficient potassium iodide was added to keep the available iodine content between .2 and .4 P. P. M., which in effect represented the total iodine, since the available chlorine was generally maintained in stoichiometric excess over the iodine. The test lasted for 30 days and analyses of the pool water were made from time to time for free available chlorine, chloramine and iodine (here meaning free or available iodine). The precise nature of the operations, and the results obtained, were as follows:

On the first day a solution of 248 grams of potassium iodide in 2.5 liters of water was fed into the recirculated stream over a period of one and one-quarter hours. At the end of this time analysis showed free chlorine 0.4 P. P. M. (.0113 milliequivalent per liter), chloramine 0.2 P. P. M. (.00564 milliequivalent per liter), iodine 0.33 P. P. M. (.0026 milliequivalent per liter). On the second day 200 grams of potassium iodide was added in about the same way. Analysis showed no free chlorine, chloramine .14 P. P. M., and iodine .39 P. P. M.

Potassium iodide treatment on the third day was the same as the second, the analysis after treatment being .07 P. P. M. free chlorine, chloramine .1 P. P. M., and iodine .21 P. P. M. On the fourth, fifth and sixth days treatment was with chlorine only, potassium iodide being omitted. On the seventh day the treatment was the same as the third, the subsequent analysis being free chlorine .13 P. P. M., chloramine .08 P. P. M., and iodine .22 P. P. M. The treatment on the eighth day was again about the same as the third, the analysis being free chlorine .35 P. P. M., chloramine .28 P. P. M., and iodine .27 P. P. M.

The treatment was carried along essentially in the manner described above for a total period of 30 days, the operations for the 22 days subsequent to those particularized being of the same sort and yielding corresponding results as to content of the various active agents. Throughout the period more than 50 samples were taken and tested for bacteria, specially for *E. coli*; no confirmed coliform test was obtained from any of the samples. The results indicated that whereas the free chlorine content dropped to rather low values for considerable periods of time, i. e. of the order of .1 P. P. M., the treatment was effective to maintain a desirable iodine concentration of at least about .2 to .4 P. P. M., which unquestionably provided a much better sterilizing action than if the chlorine had been supplied alone.

A second example of the process involved the generally similar treatment of another outdoor swimming pool, containing 880,000 gallons of water, recirculated once every nine hours, and using about 100,000 gallons per day of make-up water. The existing purification system included filter tanks and ammonium-alum treatment, and in addition, treatment with chlorine and with ammonia gas, so that the available chlorine in the water was always in the form of chloramines. Throughout the test the stated treatments were maintained and were supplemented by periodic additions of iodide, the operations and analyses at various times being as follows:

On the first day, 790 grams of sodium iodide in 11.5 liters of water were fed at the rate of 2.5 liters per hour. After the treatment the chloramine residual was .46 P. P. M. (.013 milliequivalent per liter), and the iodine (i. e. free iodine) was .17 P. P. M. (.00134 milliequivalent per liter).

During the second day no iodide was fed, with the result that on the morning of the third day the iodine residual was .08 P. P. M. while the chloramine was .55 P. P. M. A solution of 1190 grams of sodium iodide was then slowly introduced; the iodine concentration rose to .37 P. P. M., while the chloramine became .40 P. P. M. The process was continued sometimes with and sometimes without further iodide, for six more days in about the same manner and with corresponding results. An unusually large volume of water had been replaced at the beginning of the ninth day, and the iodine content was down to .06 P. P. M., with the available chlorine residual practically zero. A solution of 1500 grams of potassium iodide was gradually added, bringing the iodine concentration to .40 P. P. M. while the chloramine residual had built up to .12 P. P. M..

After four days further of the same kind of operation, the iodine treatment was increased, i. e. in that a solution of 2200 grams of potassium iodide was introduced. The iodine concentration consequently rose from .18 P. P. M. to .50 P. P. M., and the chloramine residual became .36 P. P. M. Similar concentrations were maintained by appropriate procedure for four days more, followed by two days without addition of iodide and then two final days with very large iodine doses.

Before the first large dose the iodine concentration was .2 P. P. M. A solution of 3500 grams of potassium iodide in 5 liters of water was fed in two hours, raising the iodine content to .77 P. P. M. while the chloramine residual reached .33 P. P. M. Immediately after the analysis, 875 grams more of potassium iodide were similarly added, and the iodine concentration climbed to .91 P. P. M., with the chloramine dropping to .19 P. P. M. By like additions from time to time, the iodine was kept at about the same value for the rest of the two day period.

Throughout the twenty-one days of treatment the pool was in regular and constant use by swimmers and the operation was very satisfactory to all concerned, particularly in that there was no unpleasant odor or irritating effect.

Biological tests have also been made to demonstrate the efficacy of the present procedures in actual sterilization. The tests involved inoculating water samples with bacteria, then subjecting samples to the treatment of the invention, and thereafter examining the samples by accepted bacteriological methods to determine the extent and rate of bactericidal action. Tests of this sort are believed to be properly significant and indeed more so than mere examination of samples taken from a swimming pool where the present process is in use. In the first place, the normal operation of swimming pools involves many uncontrollable variables that jointly militate against any true bacteriological evaluation of a particular sterilization process. Furthermore, water samples taken at random from a well operated pool seldom contain organisms of sanitary significance, e. g. bacteria which would be dangerous to health. This condition would usually occur even under prior types of operation, but it is not at all significant of the absolute safety of the pool. As indicated hereinabove, a principal danger of infection is that organisms introduced by one swimmer may reach another a minute or two later and infect him before a slow sterilizing agent such as chloramine can kill them; yet by the time a test sample of water is taken and examined, there has usually been a long enough contact time to destroy the bacteria.

For one set of tests involving a significantly predetermined inoculation, the water used was taken from a pool that was in actual but moderate use and that would seldom reveal bacteria on random sampling. The pool was under treatment with both chlorine and ammonia, and the withdrawn samples of water were further treated with chlorine (where necessary) to have different graduated residuals, identified below simply as "chlorine" but in fact at least largely in the chloramine form. Thereupon each sample was split into several portions, and each portion was first treated with a different amount of iodide, and was finally inoculated with 500,000 *E. coli* per cc.

After various short time intervals, each sample portion was quickly treated with sulphite, to eliminate the available chlorine and iodine, and with the bactericidal action thus arrested, a bacterial count was made. The results were as shown in the following table:

|  | Cl Res. (P.P.M.) | P.P.M. Iodide | E. coli Count | | | | |
|---|---|---|---|---|---|---|---|
|  |  |  | 1 Min. | 2 Min. | 5 Min. | 10 Min. | 30 Min. |
| Sample #1 | 0.09 | 0 | 264,000 |  |  |  | 186,000 |
|  | 0.09 | 0.1 | 180,000 | 90,000 | 3,000 | 0 |  |
|  | 0.09 | 0.2 | 162,000 | 137,000 | 40,000 | 0 |  |
|  | 0.09 | 0.5 | 6,000 | 0 |  |  |  |
|  | 0.09 | 1.0 | 0 |  |  |  |  |
| Sample #2 | 0.22 | 0 |  |  |  | 306,000 |  |
|  | 0.22 | 0.2 |  | 282,000 | 4,400 | 0 |  |
|  | 0.22 | 0.5 |  | 2,300 | 0 |  |  |
| Sample #3 | 0.37 | 0 |  |  |  | 502,000 |  |
|  | 0.37 | 0.2 |  | 210,000 | 0 |  |  |
|  | 0.37 | 0.5 |  | 1,500 | 0 |  |  |
| Sample #4 | 0.57 | 0 |  |  |  | 324,000 |  |
|  | 0.57 | 0.2 |  | 144,000 | 0 |  |  |
|  | 0.57 | 0.5 |  | 1,200 | 0 |  |  |
| Sample #5 | 0.68 | 0 | 133,000 | 0 |  |  |  |
|  | 0.68 | 0.2 | 1,400 | 0 |  |  |  |
| Sample #6 | 0.82 | 0 |  | 102,000 |  |  |  |
|  | 0.82 | 0.2 | 2,000 | 0 |  |  |  |
| Sample #7 | 0.96 | 0 | 198,000 | 92,000 |  |  |  |
|  | 0.96 | 0.2 | 1,600 | 0 |  |  |  |

The sterilizing efficacy of the process is manifest from the above. A few discrepancies may be noted, but these are no more than are certain to be found in any set of bacteriological tests of this character, for example chiefly because the several samples were taken on different days and from different parts of the pool. However, all portions of each sample, i. e. all portions having the same original chlorine residual, were in fact portions of the same sample so that the greatly increased sterilization rate accomplished by the use of the iodide can be readily noted.

By way of another example, similar bacteriological tests were made using bromide under conditions believed to be equivalent to those of actual swimming pool operation, in all significant respects. More specifically, a quantity of water at pH 7 was treated with one P. P. M. of ammonia (measured as the nitrogen therein) and then with 0.2 P. P. M. of free chlorine, and was allowed to stand for ten minutes, which afforded ample time for the chlorine and ammonia to combine. The water was then divided into several samples, to which various concentrations of bromide (e. g. as sodium bromide solution) were introduced; specifically, no bromide was added to one sample, and to the others, amounts of bromide ranging from 5 to 25 P. P. M., measured as bromine, i. e. measuring only the bromine itself in the compounds. At this stage of the tests each sample was in a condition equivalent to that of swimming pool water which is returning from the pool through the recirculation system to be treated with chlorine again. Accordingly, five minutes later, an additional 0.3 P. P. M. of free chlorine was added to each sample to simulate what would happen to the pool water upon treatment with further chlorine in the recirculation system as stated above.

Under actual pool conditions the water would then be returned to the pool where it would become contaminated. To simulate such contamination, each of the samples, after a further period of thirty minutes, was inoculated with a predetermined high concentration (the same for each sample) of bacteria, viz. *E. coli*. Thereafter at various short time intervals portions of each sample were withdrawn, subjected to treatment to eliminate the available chlorine and bromine, and then subjected to a bacterial count. As a result it was found that the sample not treated with bromide required more than twenty minutes for a complete kill of bacteria, whereas with 5 P. P. M. of bromide there was complete kill in 6 minutes, with 10 P. P. M. in four minutes, with 15 P. P. M. and with 20 P. P. M. in less than four minutes, and with 25 P. P. M. in three minutes.

These tests further demonstrate the efficacy of the treatment in sterilization, and show that eminently satisfactory results are obtainable with reasonably modest concentrations of bromide. Experience indicates that the selected ammonia nitrogen concentration was ample to make the results significant; it would represent a high ammonia content in actual pool operation, and was more than enough to insure the complete conversion of the chlorine to chloramine form. In fact, as little as 0.05 P. P. M. ammonia nitrogen is sufficient to combine with 0.25 P. P. M. chlorine.

As further evidencing the efficacy of the process, other tests have demonstrated that with the use of either bromide or iodide and throughout a very wide range of ammonia concentrations, the residual free chlorine or chloramine is as persistent, i. e. in promptly reaching all parts of a pool, as it is normally found to be in ordinary operation of the chlorine-ammonia process.

As shown by all of the foregoing, the procedures of the invention afford marked improvement in disinfecting operations, especially in the case of swimming pools and like recirculated systems where repeated contamination may occur and where other influences may affect the sterilizing efficiency of chlorine as heretofore employed. The process is also of considerable utility for continuous, single treatment of flowing aqueous liquid, e. g. in water supply systems, and notably where economical use is to be made of the advantages peculiar to bromine or iodine in purification, or otherwise where the application of chlorine alone might not be wholly satisfactory.

As used herein and unless specific indication to the contrary appears, the term ammonia is meant to include not only $NH_3$ and $NH_4OH$, but also ammonium and ammonia-type compounds, e. g. such as will react with active chlorine to form chloramines, under conditions of the sort contemplated. Likewise, unless the contrary is specifically indicated, the treatments of water (described herein) with free chlorine may be performed, and indeed in a number of the cited tests were performed, by introducing a hypochlorite, for instance a dilute solution of sodium hypochlorite. Feeding such compound in effect adds free chlorine to the water; it is well known that available chlorine in "free" form, whether introduced by hypochlorite or by dosage with chlorine gas, is actually a mixture of hypochlorous acid and hypochlorite ions in proportions which depend only on the pH. It will also be appreciated that reference to the removal or destruction of contaminating material in aqueous liquids, as by the agents herein described, includes and indeed usually means the elimination of the contaminating or otherwise objectionable character of such material by chemical reaction, rather than any mechanical separation of the material from the liquid.

It is to be understood that the invention is not limited to the specific procedures herein described but may be carried out in other ways without departure from its spirit as defined by the following claims:

What is claimed is:

1. Procedure for purifying a large body of aqueous liquid which is circumstanced to receive successive organic contaminations over a prolonged period of time, comprising establishing in said liquid a content of a halogen of greater atomic weight than chlorine, in available form to be active in removing such contaminations, said halogen being thereby reduced to halide form; and introducing into the liquid, throughout said prolonged period, successive quantities of chlorine in available form, for reaction with the halide, whereby a content of said first-mentioned halogen in available form is substantially continuously maintained in said liquid throughout said period.

2. Procedure for treatment of aqueous liquid to remove contaminating material, comprising supplying in the liquid a quantity of a halogen, in the form of a halide, which is of greater atomic weight than chlorine and which in its available state is adapted to react with said contaminating material to remove the same, and producing from said halide a desired concentration of the corresponding available halogen by supplying available chlorine in the liquid, in amount sufficient to react with at least an appreciable part of said halide to convert it to said available halogen.

3. Procedure for treating aqueous liquid which may have a contaminating organic content, to provide a prolonged sterilizing effect in said liquid, comprising establishing in the liquid a content of a halogen of greater atomic weight than chlorine, in available form to provide an appreciable sterilizing effect, a part of said halogen being then reduced to halide by organic content of the liquid, and continuing sterilizing action in the liquid and re-establishing said content of said available halogen for further sterilizing effect, by introducing available chlorine in the liquid to provide a residual content of available chlorine and to convert at least a substantial part of the aforesaid halide into available halogen.

4. Procedure for purification treatment of aqueous liquid, comprising establishing therein a content of a halogen, at least partly in the form of a halide, of greater atomic weight than chlorine, and supplying available chlorine to the liquid in an amount sufficient both to react with at least an appreciable quantity of contaminating material in the liquid and to convert at least an appreciable quantity of the aforesaid halide to the corresponding halogen in active form.

5. Procedure for treatment of aqueous liquid to remove contaminating material which is susceptible of such removal by reaction of an available halogen therewith, comprising establishing in the liquid a content of a halogen, in the form of a halide, of greater atomic weight than chlorine, said halide content consisting of an amount thereof approximately only sufficient to furnish, in the presence of a predetermined form of available chlorine and by reactive effect thereof, an ultimately desired, predetermined content of the corresponding available halogen in the liquid, and supplying available chlorine to the liquid in amount sufficient to react with an appreciable quantity of contaminating material, said supplied available chlorine being additionally sufficient in amount and character to establish said predetermined content of said available halogen by reactive effect on said halide.

6. Procedure for treatment of aqueous liquid to remove contaminating material, comprising establishing in the liquid a content of iodide approximately only sufficient to furnish, by reaction with available chlorine, an ultimately desired, predetermined content of available iodine in the liquid, and supplying available chlorine to the liquid in amount sufficient to react with an appreciable quantity of contaminating material in the liquid and also to react with the iodide to furnish said predetermined content of available iodine.

7. Procedure as described in claim 6 wherein the iodide is established in amount approximately only sufficient to furnish an ultimate content of available iodine of less than 2 P. P. M., said available chlorine being supplied in amount sufficient to react with all contaminating material then present which would be reacted upon by available iodine, as well as in amount sufficient to react to furnish said available iodine content.

8. Procedure for treatment of aqueous liquid to remove contaminating material, comprising establishing in the liquid a content of bromide approximately only sufficient to furnish, by reactive effect of a predetermined form of available chlorine in the liquid, an ultimately desired predetermined content of available bromine, and thereafter establishing in the liquid a content of said predetermined form of available chlorine sufficient to react with an appreciable quantity of contaminating material and also to react to furnish, from said bromide, said predetermined content of available bromine.

9. Procedure as described in claim 8 wherein the bromide is established in amount approximately only sufficient to furnish an ultimate content of available bromine of less than 2 P. P. M., said available chlorine being established in amount sufficient to react with all contaminating material then present which would be reacted upon by available bromine, as well as in amount sufficient to react to furnish said available bromine content.

10. Procedure for treatment of aqueous liquid which contains ammonia, to remove contaminating material, comprising establishing in the liquid a content of atoms of a halogen of greater atomic weight than chlorine, said halogen atoms being available, at least upon oxidation reaction by chlorine, for reaction with the contaminating material, and supplying available chlorine to the liquid for establishing, in the presence of said ammonia, a predetermined residual content of chloramine sufficient to insure actual availability, for reaction against the contaminating material, of at least a part of said halogen atoms, by said oxidation reaction.

11. Procedure for treatment of a body of aqueous liquid which contains ammonia, to remove contaminating material, comprising establishing and maintaining in the liquid a content of a halogen of greater atomic weight than chlorine, said halogen being present at least partly as available halogen convertible to halide by reaction with the contaminating material, and regularly supplying available chlorine to the liquid in sufficient amount to maintain, in the presence of said ammonia, a predetermined residual content of chloramine, and also to maintain a predetermined residual content of said first mentioned halogen in available form, by oxidation reaction upon said halide.

12. Procedure as described in claim 11 in which the first mentioned halogen is iodine and in which the total amount of iodine maintained in the liquid and the amount of chlorine supplied are controlled relative to each other so that there is always present an excess of available chlorine over an amount theoretically necessary to keep all of the iodine in free form by oxidation of same from the form of iodide.

13. Procedure as described in claim 11 in which the first mentioned halogen is bromine, a large preponderance thereof being maintained in the form of bromide, and in which the total amount of bromine maintained in the liquid and the amount of chlorine supplied are controlled relative to each other so that there is always present a large excess of bromide over an amount with which the available chlorine content might in theory react.

14. Procedure for treatment of a body of aqueous liquid to remove contaminating material, comprising establishing and maintaining a content of iodine in the liquid by supplying iodide thereto, and supplying free chlorine and ammonia to the liquid to maintain a predetermined residual of chloramine therein and to maintain a predetermined residual of available iodine therein by reaction converting iodide to available iodine, said chlorine being supplied in an amount in excess of that theoretically necessary to keep all of the iodine in available form by said reaction.

15. Procedure for treatment of a body of aqueous liquid to remove contaminating material, comprising establishing and maintaining a content of bromine in the liquid by supplying bromide thereto, and supplying free chlorine and ammonia to the liquid to maintain a predetermined residual of chloramine therein and to maintain a predetermined residual of available bromine therein by reaction converting bromide to available bromine, said bromine content being maintained very preponderantly in bromide form and in large excess of said bromide over the amount with which all of the supplied chlorine might theoretically react.

16. Procedure for disinfecting treatment of a swimming pool, comprising establishing and maintaining in the water thereof a content of bromine atoms of at least about 2 P. P. M., and at least chiefly in the form of bromide, and regularly supplying available chlorine to said water to maintain therein, by reaction of said chlorine with bromide formed by reaction of bromine with contaminating material, a predetermined content of available bromine.

17. Procedure for disinfecting treatment of a swimming pool, comprising establishing and maintaining in the water thereof, by supplying bromide thereto, a content of bromine atoms of at least about 10 P. P. M., and at least chiefly in the form of bromide, and regularly supplying available chlorine to said water to maintain therein, by reaction of said chlorine with bromide formed by reaction of bromine with contaminating material, a content of available bromine having a sterilizing effect at least equal to a free chlorine content of about 0.1 P. P. M., said supply of chlorine being controlled to maintain in the water an actual residual of available chlorine which is not more in amount than about 2 P. P. M. and which contains insufficient free chlorine to liberate appreciable nitrogen trichloride when ammonia is present in the water.

18. Procedure for disinfecting treatment of a swimming pool, comprising establishing and maintaining in the water thereof a content of iodine atoms of at least about 0.1 P. P. M., and regularly supplying available chlorine to said water to maintain at least a substantial proportion of said iodine atoms as available iodine, by reaction of said chlorine with iodide formed by reaction of available iodine with contaminating material.

19. Procedure for disinfecting treatment of a swimming pool, comprising establishing and maintaining in the water thereof, by supplying iodide thereto, a content of iodine atoms of at least about 0.3 P. P. M. and sufficient to maintain in the pool, by continued reconversion from iodide, an available iodine residual of like amount, and regularly supplying available chlorine to said water to maintain said available iodine residual, by reaction of said chlorine with iodide formed by reaction of available iodine with contaminating material, said supply of chlorine being controlled to maintain in the water an actual residual of available chlorine which is not more in amount than about 2 P. P. M. and which contains insufficient free chlorine to liberate appreciable nitrogen trichloride when ammonia is present in the water.

20. Procedure for purifying a large body of water which is adapted to contain contaminating organisms and to receive further contaminating organisms from time to time over a prolonged period, and which is also adapted to have portions of its water removed from time to time and replaced by fresh water, comprising supplying to said body a quantity of a halogen in halide form, of greater atomic weight than chlorine, supplying available chlorine to the liquid for reaction with at least a part of said halide to convert the same to the corresponding halogen in available form, said available halogen being active to remove contaminating organisms and being thereby reduced to halide form, and supplying successive further amounts of available chlorine for reconversion of the said halide, at least in substantial part, to the available form, substantially as necessary, and supplying successive further quantities of the aforesaid halide to replace losses due to removal and replacement of water, said successive supply steps being cooperatively controlled to maintain an effective residual content of the aforesaid available halogen in the water throughout the aforesaid period.

21. Procedure for purifying a large body of aqueous liquid which may contain contaminating organisms and which may contain ammonia, comprising establishing in said liquid a content of available iodine to be active against such organisms, said iodine being thereby reduced to iodide form, and introducing in said liquid a content of active chlorine which, even though it is converted to chloramine form by ammonia in the liquid, is effective to convert at least an appreciable part of the iodide into available iodine.

22. Procedure for purifying a large body of aqueous liquid which may contain contaminating organisms and which may contain ammonia, comprising establishing in said liquid a content of available bromine to be active against such organisms, said bromine being thereby reduced to bromide form, and introducing in said liquid a content of active chlorine which, even though it is converted to chloramine form by ammonia in the liquid, is effective to convert at least an appreciable part of the bromide into available bromine.

HENRY CLAY MARKS.
FREDE BERNHARDT STRANDSKOV.

REFERENCES CITED

The following references are of record in the file of this patent:

UNITED STATES PATENTS

| Number | Name | Date |
| --- | --- | --- |
| 1,197,640 | Kriegsheim | Sept. 12, 1916 |
| 1,995,639 | Henderson | Mar. 26, 1935 |
| 2,055,475 | Behrman | Sept. 29, 1936 |
| 2,112,476 | Bowers | Mar. 29, 1938 |
| 2,272,223 | Pietzsch | Feb. 10, 1942 |
| 2,400,439 | Romans | May 14, 1946 |